US008444807B2

(12) United States Patent
Colin et al.

(10) Patent No.: US 8,444,807 B2
(45) Date of Patent: May 21, 2013

(54) METHOD FOR PREPARING PAPER PULP FROM RECYCLED PAPER CONTAINING CONTAMINANTS

(75) Inventors: Philippe Colin, Ingersheim (FR); Philippe Beringuet, Ecquetot (FR); Xavier Gillot, Évreux (FR); Jean-Yves Tinel, Amfreville sur Iton (FR)

(73) Assignee: SCA Tissue France, Bois-Colombes (FR)

( * ) Notice: Subject to any disclaimer, the term of this patent is extended or adjusted under 35 U.S.C. 154(b) by 856 days.

(21) Appl. No.: 12/158,160

(22) PCT Filed: Dec. 20, 2006

(86) PCT No.: PCT/FR2006/002802
§ 371 (c)(1),
(2), (4) Date: Jun. 19, 2008

(87) PCT Pub. No.: WO2007/077326
PCT Pub. Date: Jul. 12, 2007

(65) Prior Publication Data
US 2008/0302491 A1 Dec. 11, 2008

(30) Foreign Application Priority Data
Dec. 23, 2005 (FR) ...................................... 05 13280

(51) Int. Cl.
*D21D 5/04* (2006.01)
(52) U.S. Cl.
USPC ............................................. 162/4; 162/261
(58) Field of Classification Search
USPC .................................................... 162/4, 261
See application file for complete search history.

(56) References Cited

U.S. PATENT DOCUMENTS 4,017,033 A * 4/1977 Tra .................................. 241/28
4,413,789 A 11/1983 Rienecker et al.
(Continued)

FOREIGN PATENT DOCUMENTS

EP 0126632 11/1984
EP 0124431 2/1987
(Continued)

OTHER PUBLICATIONS

International Search Report of PCT/FR2006/002802, dated May 15, 2007.

(Continued)

*Primary Examiner* — Jacob Thomas Minskey
(74) *Attorney, Agent, or Firm* — Drinker Biddle & Reath LLP

(57) ABSTRACT

The invention relates to a method for preparing paper pulp from recycled paper containing contaminants characterized in that it comprises a first step of agitating the paper in the presence of water in order to obtain a mixture of fibers and contaminants in suspension, a second step of coarsely screening said mixture in order to separate the coarse contaminants from the rest of the suspension, a third step of fine screening in order to separate the fine contaminants from the coarsely-screened suspension and a fourth step of washing said coarse and fine contaminants in order to separate the reusable fibrous materials from the rest of the non-reusable contaminants. In particular, the invention aims to provide a method for preparing paper pulp that is capable of producing a good quality paper pulp from highly-contaminated recycled paper, especially having a contaminant level in the dry state that is greater than or equal to 15% by weight.

23 Claims, 1 Drawing Sheet

U.S. PATENT DOCUMENTS

| | | | |
|---|---|---|---|
| 4,460,132 A | 7/1984 | Thumm et al. | |
| 4,607,802 A | 8/1986 | Lamort | |
| 4,708,295 A | 11/1987 | Musselmann | |
| 6,006,554 A * | 12/1999 | Gallagher | 68/181 R |

FOREIGN PATENT DOCUMENTS

| | | |
|---|---|---|
| FR | 2455649 | 11/1980 |
| FR | 2493364 | 5/1982 |
| GB | 2161091 | 1/1986 |

OTHER PUBLICATIONS

Written Opinion of the International Searching Authority of PCT/FR2006/002802.

\* cited by examiner

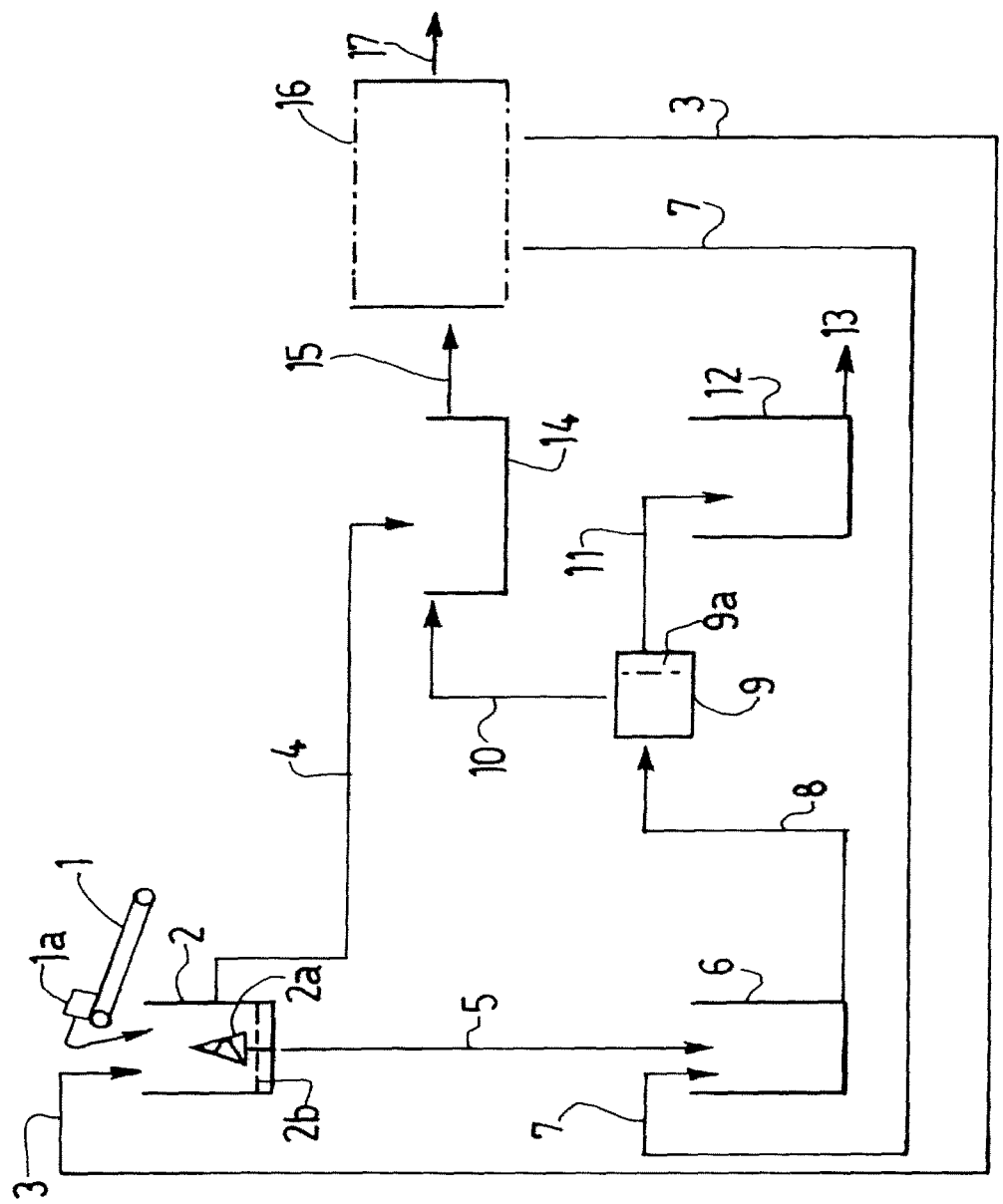

METHOD FOR PREPARING PAPER PULP FROM RECYCLED PAPER CONTAINING CONTAMINANTS

The present application claims priority to French Patent Application No. 05 13280 filed on Dec. 23, 2005, which is incorporated herein in its entirety.

The invention relates to a method for preparing paper pulp from recycled paper containing contaminants.

The invention also relates to an installation intended for the application of the said method.

Well before the international community decided to limit the growth of industrial or domestic waste which was harmful to both the environment and the economy, the paper industry had regularly been recycling some of its products for many years.

From now on, the recycling of used paper or cardboard will provide a considerable proportion of the cellulose fibres used to prepare paper pulp.

However, in spite of the increasing resources used for this purpose, the volume of recycled paper which can be used at present is still limited, and does not provide a sufficient supply to meet all requirements in this area. This is because the recycling installations used at present are only suitable for treating recycled papers with a low content of contaminants, particularly those having a content of contaminant below 15% and preferably below 3%.

When attempts were made to extend the sources of fibre supply to recycled paper with a high content of contaminant, particularly that having a content of contaminant in excess of 15%, it was found that the pulps obtained from this recycled paper frequently had a poorer quality than the pulps obtained from natural materials, and were therefore unsuitable for producing high-quality paper. This is due, in particular, to the presence in the pulp of considerable quantities of impurities, which significantly alter the mechanical or physical characteristics of the finished paper.

It has been found that the presence of these impurities in the pulp is generally due to an unsatisfactory preliminary process of separating the cellulose materials, on the one hand, from the contaminating materials, on the other hand, in the paper for recycling. The term "contaminating materials" denotes both heavy materials, such as pieces of metal, stones of varying size and shape or sand, and light materials, such as plastic film, string or adhesive.

In relatively old recycling techniques which are now obsolete, this stage of separation was generally carried out by feeding a mixture of water and recycled paper into a disintegrating apparatus of the pulper type, at the bottom of which was placed a grid pierced with holes. Any particle or material having a size greater than the diameter of the holes was therefore retained by the grid and thus formed the unused contaminant part of the recycled paper.

However, this separation process had a certain number of drawbacks.

On the one hand, there was a considerable risk that the grid of the pulper would be blocked relatively quickly because of the accumulation of the waste. It was therefore necessary to clean the grid of the pulper regularly, causing machine downtime which was harmful to the overall recycling process.

On the other hand, a relatively large amount of potentially reusable cellulose fibres was not infrequently retained on the grid of the pulper and subsequently removed with the other contaminants.

This resulted in a relatively high loss of fibres and thus a mediocre efficiency of the overall recycling process.

Furthermore, these old installations could not efficiently filter fine or small-sized contaminants, which were liable to appear in the final pulp.

It was therefore difficult to obtain a high-quality pulp, in other words one substantially free of any contaminating material.

To overcome these drawbacks, it has been proposed more recently that the filtration stage should be separated from the mashing stage.

Current recycling installations therefore now use pulpers without filtration grids, particularly pulpers with a mashing helix, called "helico" pulpers.

Such apparatus has in particular been described in Patent Applications FR 2 493 364, FR 2 455 649, EP 0 126 632 or EP 0 124 431.

This type of pulper includes a rotary stirring means of vertical axis, possessing one or more blades arranged in a helix around the axis, which means impose on the material an axial descending movement followed by centrifugal movement on a smooth bottom.

With such apparatus, the defiberizing is performed by fibre-on-fibre friction, the centrifuged material being thrown onto relatively stationary material. Little shredding takes place and consequently the contaminants or impurities are preserved and not divided, whereas the paper is defiberized.

These pulpers therefore simply put the paper fibres back into suspension in the presence of water, without altering either the cellulose materials or the contaminants.

The concentration obtained in these pulpers is around 15% as dry matter.

The resulting mixture is then sent to a filtration apparatus separate from the pulper, this apparatus performing the operation of sorting the reusable cellulose materials from the contaminants.

Various kinds of apparatus are currently available for this purpose.

However, the Applicant has obtained particularly beneficial results by using a filtration apparatus of the drainage cone type, for example that designed and produced by the Kadant Lamort company.

Such a filtration apparatus takes the form of a closed volume, generally cylindrical or substantially cylindrical, having inside it a separating grid in front of which a cleaning member commonly called a "foil" moves, the purpose of this member being to prevent contaminants from obstructing the grid. The inner space of the volume downstream of the grid is also subjected to a pressure drop by means of a pump, for example.

However, this technology has drawbacks substantially similar to those of the preceding technology.

In particular, the grid of the drainage cone filtration apparatus can become blocked as the filtration operations proceed. As before, this results in machine downtime for cleaning, and consequently a loss of output, as well as less fine and less precise filtration.

These drawbacks are also accentuated by the fact that the volume of contaminants introduced into the pulper is generally greater than that which can be accepted by a drainage cone filtration apparatus.

The substantial increase in the content of contaminant present in papers for recycling also inevitably causes a concomitant aggravation of the problems mentioned above.

In order to obtain a certain pulp quality from sources of highly contaminated raw materials, it is therefore currently necessary to increase the filtration stages excessively, or to limit the efficiency of the recycling process.

Current installations, as well as older installations, are therefore no longer capable of supplying high-quality pulps from such recycled paper, if it is desired to maintain or even increase the output and contain, or even reduce, the production costs.

The invention therefore proposes to provide a new method for preparing paper pulp from recycled papers which does not have the drawbacks of the aforementioned prior art, particularly a method for preparing paper pulp which can supply high-quality paper pulp from highly contaminated recycled paper.

For this purpose, according to the invention, what is proposed is a method for preparing paper pulp from recycled paper containing contaminants, characterized in that it comprises the following successive stages:

i) a first stage of mashing the paper in the presence of water in order to obtain a mixture of fibres and contaminants in suspension, ii) a second stage of coarse screening of the said mixture, in order to separate the coarse contaminants from the rest of the suspension, the first and second stages being carried out by means of a pulper provided with a rotary stirring means, in which at least one grid pierced with large holes is positioned under the said rotary stirring means, iii) a third stage of fine screening for separating the fine contaminants from the coarsely screened suspension obtained in stage (ii), iv) a fourth stage of washing the said coarse and fine contaminants in order to separate the recoverable fibrous materials from the rest of the non-recoverable contaminants, the said stage being carried out by means of a washing drum having at least two successive zones provided with holes over at least part of their surface, and in that the washing water coming from the first zone is sent to an intermediate mixing chest in which the coarsely screened suspension is collected before it is finely screened, and the washing water from the second zone, which has a lower fibre content than the washing water coming from the first zone, is sent to the pulper.

In another embodiment of the invention, the third stage is carried out by means of a filtration apparatus of the drainage cone type, in which a grid pierced with fine holes is placed.

In another embodiment of the invention, the diameter of the holes of the grid of the pulper is greater than the diameter of the holes of the grid of the drainage cone filtration apparatus, and is preferably at least twice as great as the diameter of the holes of the grid of the drainage cone filtration apparatus.

In another embodiment of the invention, the diameter of the holes of the grid of the pulper is in the range from 8 to 15 mm, and is preferably approximately equal to 10 mm, and the diameter of the holes of the grid of the drainage cone filtration apparatus is in the range from 2 to 6 mm, and is preferably approximately equal to 4 mm.

In another embodiment of the invention, the first pierced area of the drum has holes with a diameter of approximately 8 mm and the second pierced area has holes with a diameter of approximately 10 mm.

In another embodiment of the invention, the coarse and fine contaminants separated in the second and third stages are collected in a storage reservoir before being washed.

In another embodiment of the invention, the recycled paper has a content of contaminant in the dry state greater than or equal to 15% by weight.

Configured in this way, the invention thus makes it possible to filter the heavy or large-sized contaminants initially in the pulper, thus avoiding the problems of blocking of the grid of the drainage cone filtration apparatus, the latter apparatus simply being required to filter the finer or smaller-sized contaminants.

The invention also relates to an installation intended for the application of the said method of preparing paper pulp; the said installation is characterized in that it comprises:

a pulper equipped with a rotary stirring means and with a screening grid, the said pulper being designed to mash the paper in the presence of water so as to obtain a mixture of fibres and contaminants in suspension and to carry out coarse screening of the said mixture in order to separate the coarse contaminants from the rest of the suspension;

an additional screening device of the draining cone type, in which a grid pierced with the fine holes is placed, the said additional screening device being designed to carry out fine screening in order to separate the fine contaminants from the coarsely screened suspension;

an intermediate mixing chest for collecting the coarsely screened suspension before it is finely screened;

a washing drum designed to wash the coarse and fine contaminants in order to separate the recoverable fibrous materials from the rest of the non-recoverable contaminants, the said drum having two successive zones provided with holes over at least part of their surface; and a pipe for sending the washing water coming from the first zone to the intermediate mixing chest and a pipe for sending the washing water coming from the second zone, which has a lower fibre content than the washing water coming from the first zone, to the pulper.

In a variant of the invention, the diameter of the holes of the grid of the pulper is greater than the diameter of the holes of the grid of the additional screening device, and is preferably at least twice as great as the diameter of the holes of the grid of the additional screening device.

In another variant of the invention, the diameter of the holes of the grid of the pulper is in the range from 8 to 15 mm, and is preferably approximately equal to 10 mm, and the diameter of the holes of the grid of the additional screening device is in the range from 2 to 6 mm, and is preferably approximately equal to 4 mm.

In another variant of the invention, a first area of the drum has holes with a diameter of approximately 8 mm and a second area of the drum has holes with a diameter of approximately 10 mm.

Other advantages and characteristics will be made clearer by the following description of a method for preparing paper pulp according to the invention, which refers to the drawings in which:

FIG. 1 is a schematic representation of an installation intended for the application of the method according to the present invention.

The installation comprises, in particular, a conveyor 1 which feeds material for recycling 1a to a disintegrating apparatus 2, of the "helico" pulper type. The concentration obtained in this pulper is around 15% as dry matter.

The material for recycling 1a generally takes the form of bales or paper in bulk, including both reusable cellulose materials and non-reusable contaminating materials. The contaminating materials can represent more than 15% by weight of the said material. As a general rule, the material for recycling 1a can be selected from the materials in classes 2.06 or 5.03 according to the EN 643 standard, for example card packages for food-grade liquids of the Tetra Pak® type including plastic and/or metallic films.

The pulper 2 has a centrifugal stirring rotor 2a, rotating about a vertical axis and possessing at least one blade describing a helix around this vertical axis. Such a rotor 2a does not perform any separation: it creates frictional forces between the constituents of the material for recycling 1a, causing detachment of the inks and the disintegration of the cellulose materials, but without causing any disintegration of the contaminants. When the washing water has been added to the pulper 2 through the pipe 3, the mixture of washing water and material for recycling is then mashed by means of the rotor 2a.

A pierced extraction plate 2b, or grid 2b, placed under the rotor 2a is then used for a first coarse screening of the material for recycling 1a. In a preferred variant of the invention, the grid 2b has holes with a diameter substantially equal to 10 mm.

A discharge pipe 4, or a removable wall 4, positioned in the lower part of the pulper 2 above the grid 2b, can be used to discharge the materials retained by the grid 2b, corresponding to the unscreened fraction of pulp, towards a storage reservoir 14. This fraction theoretically contains a high proportion of contaminants and a low proportion of potentially reusable cellulose materials.

Additionally, a discharge pipe 5, opening into the lower part of the pulper 2 below the grid 2b, carries the materials not retained by the grid 2b, corresponding to the coarsely screened fraction of pulp, towards an intermediate blending chest 6. This fraction includes, for example, a relatively high quantity of cellulose materials and normally a low quantity of contaminants.

In order to optimize the output of the overall recycling process as much as possible, an additional filtration operation is therefore carried out on both the unscreened pulp fraction and the coarsely screened pulp fraction. These operations will, for example, make it possible to incorporate into the pulp the maximum quantity of cellulose materials initially present in the material for recycling, and to eliminate from the pulp all or virtually all the contaminants of the said material for recycling.

Initially, the coarsely screened pulp fraction is sent by means of a pipe 8 to a filtration apparatus 9 of the drainage cone type, which carries out a fine screening of the said fraction. The grid or screen 9a of the drainage cone filtration apparatus 9 is provided for this purpose with holes having a diameter smaller than that of the holes of the grid 2b of the pulper 2. In particular, if the diameter of the holes of the grid 2b of the pulper 2 is approximately equal to 10 mm, the diameter of the holes of the screen 9a of the drainage cone filtration apparatus 9 is approximately equal to 4 mm.

At the same time, and at regular intervals, the pulp fraction retained by the grid 9a of the drainage cone filtration apparatus 9 is sent to the storage reservoir 14, being thus added to the unscreened pulp fraction retained by the grid 2b of the pulper 2.

At the outlet of the drainage cone filtration apparatus 9, the pulp fraction not retained by the grid 9a, called the finely screened pulp fraction, therefore constitutes the pulp which is potentially usable in the downstream process of paper pulp preparation. Before being subjected to optional additional stages 13 of fibre sorting and separation, the resulting pulp is first sent to an outlet chest 12 by means of a discharge pipe 11.

As for the pulp fraction stored in the reservoir 14, this is sent by means of a pipe 15 into a washing drum 16, commonly called a trommel, which separates the reusable fibrous materials from the non-reusable contaminants. This washing drum 16 operates on the principle of an axial movement of pulp inside a hollow cylinder provided with holes in at least part of its surface. By the action of centrifugal force, the mixture is mashed, agitated and washed, the finest fractions of this pulp passing through the holes, while the coarser fractions remain in the cylinder. In a preferred variant of the invention, the drum 16 has at least one first pierced area having, in its axial direction, holes with a diameter of approximately 8 mm and a second pierced area having holes with a diameter of approximately 10 mm. This is because, when configured in this way, the washing drum 16 has proved to be particularly efficient in separating any contaminants of the cellulose materials which are still present in the pulp fraction to be processed.

At the outlet of the washing drum 16, the washing water is separated: the water from the first area, with a higher fibre content, is sent through a pipe 7 to the blending chest 6 to be processed again by the drainage cone filtration apparatus 9, while the water from the second area, with a lower fibre content, is sent through the pipe 3 to be used for dilution in the pulper 2.

As for the materials retained in the drum, these are discharged from the installation by means of a reject chute 17 before being compacted or destroyed.

Clearly, the example of embodiment described above does not limit the present invention in any way, and other modifications or addition of stages to the method or addition of devices to the installation can be envisaged without departure from the scope of the invention.

The invention claimed is:

1. A method for preparing paper pulp from recycled papers containing contaminants, comprising the following successive stages:
    a) a first stage of mashing the paper in the presence of water in order to obtain a mixture of fibres and contaminants in suspension;
    b) a second stage of coarse screening of said mixture, in order to separate said mixture into a pulper rejects stream comprising coarse contaminants and a pulper accepts stream, the first and second stages being carried out by means of a pulper with a helical agitator, in which at least one grid pierced with holes is positioned under the helical agitator;
    c) a third stage of fine screening for separating the pulper accepts stream into a secondary rejects stream comprising fine contaminants from the pulper accepts stream obtained in stage b) and a secondary accepts stream;
    d) a fourth stage of washing said pulper rejects stream comprising said coarse contaminants and said secondary rejects stream comprising said fine contaminants in order to separate recoverable fibrous materials therefrom, said fourth stage being carried out by means of a washing drum having at least two successive zones, each zone being provided with holes over at least part of its respective surface;
wherein the fiber content of water coming from the first zone is greater than that coming from the second and washing water coming from the first zone of said drum washer is sent to an intermediate mixing chest in which the accepts from said pulper is collected before being finely screened, and wherein the washing water from the second zone is sent to the pulper.

2. The method according to claim 1, characterized in that the rejects stream from said pulper and the rejects stream from said third stage are combined to be washed.

3. The method according to claim 2, characterized in that holes in said first zone of the drum washer have diameters which are substantially smaller than the diameter of holes in said second zone of the drum washer.

4. The method according to claim 3, characterized in that the diameter of holes of the grid of the pulper is greater than the diameter of holes of the grid of the drainage cone filtration apparatus, and the diameter of holes of the grid of the pulper is preferably at least twice the diameter of the holes of the grid of the drainage cone filtration apparatus.

5. The method according to claim 4, characterized in that the rejects stream from said pulper and the rejects stream from said third stage are combined to be washed.

6. The method according to claim 4, characterized in that the diameter of the holes of the grid of the pulper is in the range from 8 to 15 mm, and the diameter of the holes of the grid of the drainage cone filtration apparatus is in the range from 2 to 6 mm.

7. The method according to claim 6, characterized in that the rejects stream from said pulper and the rejects stream from said third stage are combined to be washed.

8. The method according to claim 2, characterized in that the rejects stream from said pulper and the rejects stream from said third stage are combined to be washed in said washing drum.

9. The method according to claim 1, characterized in that holes in said first zone of the drum washer have diameters which are substantially smaller than the diameter of holes in said second zone of the drum washer.

10. The method according to claim 9, characterized in that the rejects stream from said pulper and the rejects stream from said third stage are combined to be washed.

11. The method according to claim 9, characterized in that the third stage is carried out by means of a filtration apparatus of the drainage cone type, in which a grid pierced with holes is placed.

12. The method according to claim 11, characterized in that the rejects stream from said pulper and the rejects stream from said third stage are combined to be washed.

13. An apparatus for repulping and cleaning of contaminated waste paper comprising:
   a) means for supplying contaminated waste paper and water;
   b) a pulper adapted to receive said waste paper and water, said pulper being equipped with a rotary stirring means and with a screening grid, said pulper being designed to mash said contaminated waster paper in the presence of said water so as to obtain a mixture of fibres and contaminants in suspension and to carry out coarse screening of the said mixture in order to separate said mixture into a primary rejects stream and a primary accepts stream;
   c) a secondary screening device of the draining cone type, in which a grid pierced with fine holes is placed, said secondary screening device being adapted to receive and carry out fine screening of said primary accepts stream from b) in order to separate said primary accepts stream into a secondary accepts stream and a secondary rejects stream;
   d) an intermediate mixing chest disposed between said pulper and said secondary screening device, said intermediate mixing chest being adapted for collecting the primary accepts stream before it is finely screened in said secondary screening device;
   e) a washing drum adapted to receive and wash both the rejects from said pulper and the rejects from said secondary screening device, said washing drum being adapted to separate recoverable fibrous materials from the secondary and primary rejects streams, said washing drum having first zone and a second zone defined therein each provided with holes over at least part of their surface; and
   f) a conduit for sending the washing water coming from the first zone to the intermediate mixing chest and a conduit for sending the washing water coming from the second zone to the pulper, the washing water coming from the second zone having a lower fibre content than the washing water coming from the first zone.

14. The apparatus according to claim 13, characterized in that holes in said first zone of the washing drum have a diameter which is substantially less than the diameter of holes in the second zone of the washing drum.

15. The apparatus according to claim 13, characterized in that the diameter of the holes of the grid of the pulper is greater than the diameter of the holes of the grid of the secondary screening device.

16. The apparatus according to claim 15, characterized in that holes in said first zone of the washing drum have a diameter which is substantially less than the diameter of holes in the second zone of the washing drum.

17. The apparatus according to claim 15, characterized in that the diameter of holes of the grid of the pulper is at least twice the diameter of holes of the grid of the secondary screening device.

18. The apparatus according to claim 17, characterized in that holes in said first zone of the washing drum have a diameter which is substantially less than the diameter of holes in the second zone of the washing drum.

19. The apparatus according to claim 15, characterized in that holes of the grid of the pulper have a diameter in the range from 8 to 15 mm, and holes of the grid of the additional screening device have a diameter in the range from 2 to 6 mm.

20. The apparatus according to claim 19, characterized in that holes in said first zone of the washing drum have a diameter which is substantially less than the diameter of holes in the second zone of the washing drum.

21. The apparatus according to claim 20, characterized in that said first zone of the washing drum has holes with a diameter of about 8 mm while the second zone of the washing drum has holes with a diameter of about 10 mm.

22. The apparatus according to claim 13, further comprising:
   a conduit for sending said primary rejects stream from said pulper toward said washing drum to be washed at said washing drum; and
   a conduit for sending said secondary rejects stream from said secondary screening device toward said washing drum to be washed at said washing drum.

23. The apparatus according to claim 22, further comprising:
   a storage reservoir disposed upstream of said washing drum for combining said primary rejects stream from said pulper and said secondary rejects stream from said secondary screening device prior to washing in said washing drum.

* * * * *